United States Patent
Nandi et al.

(10) Patent No.: US 10,894,869 B2
(45) Date of Patent: Jan. 19, 2021

(54) FOAM INSULATION WITH ENHANCED FIRE AND SMOKE PERFORMANCE

(71) Applicant: JOHNS MANVILLE, Denver, CO (US)

(72) Inventors: Malay Nandi, Littleton, CO (US); Lance Wang, Parker, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 16/693,495

(22) Filed: Nov. 25, 2019

(65) Prior Publication Data

US 2020/0095390 A1 Mar. 26, 2020

Related U.S. Application Data

(62) Division of application No. 15/718,273, filed on Sep. 28, 2017, now Pat. No. 10,563,033.

(51) Int. Cl.

| | |
|---|---|
| C08J 9/14 | (2006.01) |
| C08J 9/00 | (2006.01) |
| E04B 1/94 | (2006.01) |
| C08G 18/08 | (2006.01) |
| C08G 18/76 | (2006.01) |
| C08G 18/42 | (2006.01) |
| C08K 5/5333 | (2006.01) |
| C08K 5/098 | (2006.01) |
| C08K 5/521 | (2006.01) |
| E04B 1/80 | (2006.01) |
| E04D 11/02 | (2006.01) |
| E04D 3/35 | (2006.01) |
| C08G 18/09 | (2006.01) |
| C08G 18/22 | (2006.01) |
| E04D 13/16 | (2006.01) |
| C08G 18/66 | (2006.01) |
| C08J 9/12 | (2006.01) |
| C08G 18/38 | (2006.01) |
| C08G 101/00 | (2006.01) |

(52) U.S. Cl.
CPC .......... *C08J 9/0038* (2013.01); *C08G 18/092* (2013.01); *C08G 18/14* (2013.01); *C08G 18/222* (2013.01); *C08G 18/225* (2013.01); *C08G 18/3878* (2013.01); *C08G 18/42* (2013.01); *C08G 18/4202* (2013.01); *C08G 18/4208* (2013.01); *C08G 18/6633* (2013.01); *C08G 18/7664* (2013.01); *C08J 9/0023* (2013.01); *C08J 9/125* (2013.01); *C08J 9/141* (2013.01); *C08J 9/146* (2013.01); *C08K 5/098* (2013.01); *C08K 5/521* (2013.01); *C08K 5/5333* (2013.01); *E04B 1/80* (2013.01); *E04B 1/946* (2013.01); *E04D 3/351* (2013.01); *E04D 11/02* (2013.01); *E04D 13/1643* (2013.01); *C08G 2101/005* (2013.01); *C08G 2101/0025* (2013.01); *C08G 2101/0041* (2013.01); *C08G 2105/02* (2013.01); *C08J 2203/14* (2013.01); *C08J 2205/044* (2013.01); *C08J 2205/052* (2013.01); *C08J 2205/10* (2013.01); *C08J 2375/04* (2013.01); *C08J 2375/06* (2013.01); *C08J 2379/04* (2013.01); *E04B 1/942* (2013.01)

(58) Field of Classification Search
CPC .... C08G 18/092; C08G 18/14; C08G 18/222; C08G 18/225; C08G 18/3878; C08G 18/42; C08G 18/4202; C08G 18/4208; C08G 18/6633; C08G 18/7664; C08G 2101/0025; C08G 2101/0041; C08G 2101/005; C08G 2105/02; C08J 9/0023; C08J 9/0038; C08J 9/125; C08J 9/141; C08J 9/146; C08J 2203/14; C08J 2205/044; C08J 2205/052; C08J 2205/10; C08J 2375/04; C08J 2375/06; C08J 2379/04; C08K 5/098; C08K 5/521; C08K 5/5333; E04B 1/80; E04B 1/942; E04B 1/946; E04D 3/351; E04D 11/02; E04D 13/1643

See application file for complete search history.

(56) References Cited

U.S. PATENT DOCUMENTS

| | | | | |
|---|---|---|---|---|
| 4,946,922 | A  * | 8/1990 | Reisch | C08G 18/4009 |
| | | | | 252/182.18 |
| 10,525,663 | B2 * | 1/2020 | Nandi | E04B 1/80 |
| 2014/0171527 | A1 * | 6/2014 | Yu | C08J 9/02 |
| | | | | 521/121 |
| 2015/0197614 | A1 * | 7/2015 | Chen | C08J 9/0023 |
| | | | | 521/112 |
| 2015/0329691 | A1 * | 11/2015 | Skowronski | C08K 5/521 |
| | | | | 521/131 |

* cited by examiner

Primary Examiner — John M Cooney
(74) Attorney, Agent, or Firm — Robert D. Touslee (57) ABSTRACT

A polyisocyanurate foam insulation product includes polyisocyanurate foam produced from reacting an isocyanate and a polyol blend having a functionality of at least 2.2. The isocyanate and the polyol blend are reacted so that the polyisocyanurate foam has an isocyanate index equivalent with or greater than 300. The polyisocyanurate foam includes a fire retardant and includes between 0.02 and 0.45 weight percent of a zinc salt compound. The foam insulation board exhibits a flame spread of no greater than 25 and a smoke index of no greater than 50 when exposed to flame conditions in accordance with an ASTM E-84 test.

18 Claims, 5 Drawing Sheets

FOAM INSULATION WITH ENHANCED FIRE AND SMOKE PERFORMANCE

CROSS REFERENCE TO RELATED APPLICATION

This application is a divisional of pending U.S. application Ser. No. 15/718,273, filed Sep. 28, 2017.

BACKGROUND OF THE INVENTION

Polyurethane/Polyisocyanurate foam (PIR/PUR boardstock) has been widely used to insulate roofs and walls of commercial and industrial buildings due to its excellent thermal insulation, flame resistance, and mechanical properties. The reason for its excellent flame resistance is formation of isocyanurate trimer during the foaming process. However, certain building insulation applications, such as air handling, require very stringent fire and smoke performance that even standard PIR/PUR boardstock cannot meet.

BRIEF SUMMARY OF THE INVENTION

Embodiments described herein improve the flame spread and smoke development characteristics of polyisocyanurate foam boards. According to one aspect, a polyisocyanurate foam insulation product includes polyisocyanurate foam that is produced from reacting an isocyanate and a polyol blend having a functionality of at least 2.2. The isocyanate and the polyol blend are reacted so that the polyisocyanurate foam has an isocyanate index equivalent with or greater than 300. The polyisocyanurate foam includes a blowing agent and a fire retardant and includes between 0.02 and 0.45 weight percent of a Zinc salt compound. For a foam insulation board having a thickness of 1.5 inches or less, the foam insulation board exhibits a flame spread of no greater than 25 and a smoke index of no greater than 50 when exposed to flame conditions in accordance with an ASTM E-84 test.

According to another aspect, a foam insulation board includes a polyisocyanurate foam that is produced from reacting an isocyanate and a polyol blend. The polyol blend has a functionality of at least 2.2 and the isocyanate and the polyol blend are reacted so that the polyisocyanurate foam has an isocyanate index of between 350 and 450. The polyisocyanurate foam includes a fire retardant and between 0.045 and 0.23 weight percent of a Zinc carboxylate compound. The foam insulation board exhibits a flame spread of no greater than 25 and a smoke index of no greater than 50 when exposed to flame conditions in accordance with an ASTM E-84 test.

According to another embodiment, a method of producing a foam insulation board includes reacting an isocyanate with a polyol blend to form polyisocyanurate foam, adding a fire retardant to the polyisocyanurate foam, and adding between 0.02 and 0.45 weight percent of a zinc salt compound to the polyisocyanurate foam. The polyol blend has a functionality of at least 2.2 and the isocyanate and the polyol blend are reacted so that the polyisocyanurate foam has an isocyanate index equivalent with or greater than 300. The foam insulation board exhibits a flame spread of no greater than 25 and a smoke index of no greater than 50 when exposed to flame conditions in accordance with an ASTM E-84 test.

DETAILED DESCRIPTION OF THE INVENTION

The embodiments described herein are directed to polyisocyanurate foam boards that exhibit improved smoke and flame resistance in comparison with similar conventional polyisocyanurate foam boards. The increased smoke and flame resistance of the polyisocyanurate foam boards described herein is exhibited in that the polyisocyanurate foam boards have a flame spread of no greater than 25 and a smoke index of no greater than 50 when exposed to flame conditions in accordance with the ASTM E-84-17 test.

The polyisocyanurate foam boards are typically rigid foam boards that include a fire retardant, multi-functional polyols, such as di-functional (diols) and trifunctional (triol) polyester polyol, and a smoke suppressant. The polyisocyanurate foam has a high isocyanate index—i.e., an index that is equivalent with or greater than 300. The fire retardant may be a halogenated or non-halogenated fire retardant, such as an isocyanate reactive non-halogenated phosphonate fire retardant. The smoke suppressant is a zinc salt and more commonly zinc carboxylate.

Polyisocyanurate foams, also called "polyiso" foams may be made by combining separate liquid mixtures that include the polyisocyanates (the A-side mixture) and the polyols (the B-side mixture). The A-side mixture and B-side mixture mix together to form the polyiso foam product.

While similar classes of reactants are used for polyisocyanurate (PIR) and polyurethane (PUR) foam formulations, the PIRs are formed under conditions that promote the trimerization of the polyisocyanate reactants into isocyanurate rings. The reaction scheme below shows the formation of a isocyanurate ring from the trimerization of three generic diisocyanate molecules:

The polyisocyanate reactants (e.g., diisocyanate reactants) still leave active isocyanate groups on the isocyanurate ring after trimerization which can react with additional polyisocyanurate reactants and the polyol reactants. The isocyanurate rings react with the polyols to form a cross-linked polyisocyanurate polymer. When the polyisocyanurate polymer is formed with the help of a blowing agent, it forms a PIR foam. The presence of the isocyanurate rings in the molecular structure of a PIR foam normally impart greater stiffness and higher resistance to chemical and thermal breakdown compared with polyurethane foams.

Because a distinguishing characteristic of the PIR formation is the trimerization of the isocyanate reactant to form isocyanurate rings, PIR formulations generally have a larger molar portion of the polyisocyante to polyol, and include polyisocyanate trimerization catalysts. In many instances, the polyols used in the formulations are also different.

The A-side mixture may include one or more polyisocyanate compounds. Example polyisocyanates may include substituted or unsubstituted polyisocyanates, and more specifically include aromatic, aliphatic, and cycloaliphatic polyisocyanates having at least two isocyanate functional groups. Specific example aromatic polyisocyanates include 4,4'-diphenylmethane diisocyanate (MDI), polymeric MDI (PMDI), toluene disisocyanate, and allophanate modified isocyanate. A commercial example of a isocyanate formulation that may be used in the present formulations is Wannate® PM-700 manufactured by Wanhua Chemical Group Co., Ltd. of Yantai, China. This isocyanate formulation may have a viscosity of about 600 mPa at 25° C., a functionality of about 2.9, and an isocyanate content of about 30.4%.

The B-side mixture of the polyiso foam may include one or more polyol compounds and particularly polyols with a high functionality. In particular, the polyol compounds have a functionality of 2.1 or higher and more commonly a functionality of 2.2 or higher. In some embodiments, the polyol compounds may have a functionality of between 2.1 and 7.0 and more commonly between 2.2 and 7.0. The polyol compounds include a combination of di-functional (diols) and trifunctional (triol) polyester polyol. In some instances, the polyol compounds may include tetrols in addition to the diols and/or triols. Polyiso foams having a higher polyol functionality may increase the cross linking density and offer several advantages, such as dimensional stability.

The polyol typically includes either or both a polyether and polyester having a hydroxyl number between about 25 and 500, and more commonly between about 200 and 270. The hydroxyl number is a measure of the concentration of the hydroxyl group in the polyol, which is expressed as the milligrams of KOH (potassium hydroxide) equivalent to the hydroxyl groups in one gram of polyol. Polyether is commonly not used in conventional polyisocyanurate foam boards because it is typically less flame resistant than the aromatic polyester that is used in such boards. A lower hydroxyl number commonly results in longer polymer chains and/or less cross linking, which results in a relatively loose polymer chain. In contrast, a higher hydroxyl number commonly results in more cross linking and/or shorter polymer chains, which may provide enhanced mechanical properties and/or flame resistance.

Example polyols may include polyether polyols, polyester polyols, polycarbonate polyols, aromatic polyols (including polyester polyols, PET-based polyols, and polyamide-based polyols), and mannich polyols. Polyether polyols may be made by polymerizing one or more types of epoxides, such as ethylene oxide or propylene oxide. They may also be made by polymerizing the epoxide with a polyol such as a diol (e.g., glycol), triol (e.g., glycerin), or other polyol. Example polyether polyols may include polyether diols such as polyether polyethylene glycol, polypropylene glycol, and poly(tetramethylene ether) glycol, among other polyether diols.

Polyester polyols may be made by the stepwise polymerization of polyols and polycarboxylic acids. For example, polyester polyols may be formed by the reaction of a glycol such as diethylene glycol with a dicarboxylic acid such as phthalic acid to form an aromatic polyester polyol. Commercially available polyester polyols that may be used with the present formulations include those sold by Invista, including Terate® HT 5503 and Terate® HT 5349. Terate® HT 5503 may have a hydroxyl number between 224 and 245, and a functionality of about 2.0. Terate® HT 5349 may have a hydroxyl number between 295 and 315, and a functionality of about 2.45. The polyols used may be only polyester polyols and may exclude other polyols.

Polycarbonate polyols are a special class of polyester polyol, which can be produced through polycondensation of diols with phosgene or transesterification of diols, such as hexane diol, with carbonic acid ester. Polycarbonate polyols may be produced from propylene oxide and carbon dioxide blended with dibasic ester under catalytic condition. The carbon dioxide may account for approximately 40% of the polyol mass. The polyol may have a functionality of about 2.0 and may have hydroxyl number of about 72. Commercial available polycarbonate polyols include Converge Polyol sold by Novomer, now Saudi Aramco. The polycarbonate polyol may be used as blend with polyester polyol such as Terate® HT 5503.

Catalysts used in polyisocyanurate foam formulations normally include trimerization catalysts that catalyze the formation of cyclic isocyanurate trimers from the polyisocyanate reactant. Example trimerization catalysts include tertiary amines, such as 1, 3, 5-tris(3-(dimethylamino)propyl)-hexahydro-triazine and quaternary ammonium salts, such DABCO-TMR and DABCO-TMR2 sold by AirProducts now Evonik. Example catalysts may also include metal catalysts, such as potassium octoate and potassium acetate. Example catalysts that may be useful in embodiments of the invention include OMG 977™ and OMG 1123™ catalysts sold by Borchers OM Group, and TMR-20™ catalyst sold by Evonik. The inclusion of quaternary amine catalyst, such as TMR and TMR2, and metal catalyst TMR-20 are particular important for the high index formulation—i.e., an index greater than or equal to 300. These catalysts enable efficient conversion of isocyanate function group to isocyanurate structure even at high index (>300), which other trimer catalysts cannot achieve.

The present polyisocyanurate foams may also include one or more surfactants. The surfactants function to improve compatibility of the formulation components and stabilize the cell structure during foaming. Example surfactants can include organic or silicone based materials, or non-silicone materials. Example surfactants that may be useful in embodiments of the invention include Vorasurf™ sold by The Dow Chemical Company and DC 193 sold by Dow Corning Company.

The present polyisocyanurate foam may also include a halogenated and/or non-halogenated fire retardant. Exemplary halogenated fire retardants that may be employed in the polyisocyanurate foam include tris(2-chloroisopropyl) phosphate (TCPP) and PHT4-Diol with the latter being a reactive brominated fire retardant, such as SAYTEX® RB-79 sold by Albemarle corporation. The non-halogenated fire retardant may be a phosphorus containing fire retardant that is isocyanate reactive and more commonly an isocyanate reactive mono-hydroxyl phosphorus containing non-halogenated. In some embodiments, the phosphorous containing non-halogenated fire retardant includes, or is a blend of, organa phosphorus compounds including: an organo-phosphate, an organo-phosphite, and/or an organo-phosphonate. The non-halogenated organo phosphorus fire retardant could be non-reactive or reactive, i.e. containing isocyanate reactive functionality. An exemplary non-reactive organo phosphorus fire retardant is a blend of butyl diphenyl phosphate, dibutyl phenyl phosphate, and triphenyl phosphate. An exemplary the isocyanate reactive mono-hydroxyl phosphorus containing non-halogenated fire retardant is diethyl hydroxymethyl phosphonate (DEHMP). In other embodiments, the phosphorous containing non-halogenated fire retardant may include: dialkyl hydroxyalkanephosphonate (e.g., dimethyl hydroxymethylphosphonate), diaryl hydroxyalkanephosphonate (e.g., diphenyl hydroxymethylphosphonate), and the like.

The non-halogenated fire retardant may also reduce the amount of halogenated fire retardants (e.g., TCPP) used in the foams. The polyisocyanurate foam may be able to form a sufficiently stable char when exposed to flame conditions in accordance with ASTM E-84. The stable char aids in the polyisocyanurate foam passing the ASTM E-84 test.

In an exemplary embodiment, the polyisocyanurate foam includes a non-halogenated phosphorous containing fire retardant, and more commonly an isocyanate reactive and/or isocyanate reactive mono-hydroxyl phosphorus containing non-halogenated fire retardant (e.g., DEHMP). The use of the non-halogenated phosphorous containing fire retardant may significantly increase the ability of the polyisocyanurate foam board to exhibit a flame spread of no greater than 25 and a smoke development of no greater than 50 in accordance with the ASTM E-84 test. The polyisocyanurate foam include between about 2 and 10 weight percent, and more commonly between about 2 and 8 weight percent, of the fire retardant and specifically the phosphorous containing non-halogenated fire retardant. In a specific embodiment, the polyisocyanurate foam include between about 2 and 6 weight percent of the fire retardant or between 2 and 5 weight percent of the fire retardant.

Select embodiments of the present polyisocyanurate foams may further include one or more of initiators and carbohydrates. Unlike catalysts, an initiator is consumed during the polymerization reaction and becomes part of the polyiso foam product. Example initiators may include aliphatic and aromatic polyamines, such as ethylene diamine, toluene diamines such as a combination of 3,5-diethyltoluene-2,4-diamine and 3,5-diethyltoluene-2,6-diamine sold under the tradename Ethacure® 100 by Albemarle Corp, and polyetheramines such as Jeffamine® T-403 and D-230 sold by Huntsman Corporation, among others. A carbohydrate may include a monosaccharide, an oligosaccharide, and/or a polysaccharide. Specific examples include sucrose and/or high-fructose corn syrup (HFCS), among other carbohydrates. While the carbohydrates include a plurality of hydroxyl groups, they are not believed to react with the polyisocyanates to as great an extent as the urethane polyols, and in some formulations they may not react at all.

The blowing agents used to make the foam may include or consist of a hydrocarbon gas (e.g., n-pentane, isopentane, cyclo-pentane, etc.), a fluorocarbon gas, water, or other blowing agents. The blowing agent may include a mixture of isopentane and n-pentane. Specific examples of fluorocarbon gases may include HFC-245fa (i.e., 1,1,1,3,3-pentafluoropropane) commercially available under the tradename Enovate® from Honeywell Corp., HFC-365mfc (i.e., CF$_3$CH$_2$CF$_2$CH$_3$), HFC-134a (i.e., 1,1,1,2-tetrafluoroethane), HCFO 1233zd (i.e., trans-1-chloro-3,3,3-trifluoropropene) sold under tradname Solstice® LBA by Honeywell Corp., Forane® 1233zd by Arkema, and HFO-1336mzz (1,1,1,4,4,4-hexafluoro-2-butene) sold under trade name Opteon 1100 by Chemours. The blowing agent may be in the B-side mixture. In some embodiments, the blowing agent is a 50/50 mixture of n-pentane and isopentane.

The B-side mixture may also include an emulsifier.

The polyisocyanurate foam has an isocyanate index greater than or equivalent to 300, such as between 300 and 500. The isocyanate index is more commonly between 350 and 450 and most commonly between 350 and 400. When isocyanate reacts with one or more polyols to form polyurethane, one NCO group reacts with one OH group. As is known in the art, the index is defined as the ratio of NCO group to OH group multiplied by 100 as shown in the formula below:

$$\text{Index} = \frac{\text{Moles of NCO group}}{\text{Moles of OH group}} \times 100$$

When the number of NCO group equals the number of OH group in a formulation, a stoichiometric NCO:OH ratio of 1.0 is realized and a polyurethane polymer/foam is produced. When the number of NCO groups is significantly more than the number of OH groups in a formulation, the excess isocyanate group reacts with itself under catalytic condition to form isocyanurate linkage and polyisocyanurate foam is produced. The above described isocyanate index, and especially an index of between about 350 and 400, provides at least a 3.5:1 ratio of NCO groups to OH groups, which has been found to provide an appreciable combination of structure integrity, thermal strength and/or stability, and fire resistance.

The polyisocyanurate foam also includes a zinc salt compound that functions as a smoke suppressant as part of its B-side mixture. In an exemplary embodiment, the zinc salt compound comprises or consists of zinc carboxylate. An example of a zinc salt compound that is usable in the embodiments described herein is KKAT®XK-614 Zinc complex available from King Industries, Inc. USA.

The zinc salt compound may be added to the B-side mixture so that the B-side mixture comprises between about 0.1 to 2.0 parts of the zinc salt compound, which results in the polyisocyanurate foam including between 0.02 and 0.45 weight percent of the zinc salt compound. The zinc salt compound is more commonly added to the B-side mixture so that the B-side mixture comprises between about 0.2 to 1.0 parts of the zinc salt compound, which results in the polyisocyanurate foam including between 0.045 and 0.23 weight percent of the zinc salt compound. The zinc salt compound may alternatively be added to the B-side mixture so that the B-side mixture comprises between about 0.2 to 0.8 parts or between about 0.2 and 0.6 parts of the zinc salt compound, which results in the polyisocyanurate foam including between about 0.045 and 0.18 or between 0.045 and 0.14 weight percent of the zinc salt compound, respectively.

Conventional polyisocyanurate foams include other smoke suppressant compounds, such as manganese and/or bismuth. Manganese and bismuth are commonly believed to be better smoke suppressants than zinc. Despite the widely held belief that manganese and bismuth are better smoke suppressants, it was determined that in the instant polyisocyanurate foam, manganese and bismuth were not sufficiently effective to enable the polyisocyanurate foam board to exhibit a smoke index of no greater than 50 when exposed to flame conditions in accordance with an ASTM E-84 test.

Stated differently, the polyisocyanurate foam boards were not able to exhibit a smoke index of no greater than 50 in accordance with the ASTM E-84 test when manganese and/or bismuth were employed as the smoke suppressant despite the common belief that these products are superior at suppressing smoke and despite the remainder of the polyisocyanurate foam board composition being essentially equivalent—i.e., high polyol functionality, high isocyanate index, the use of halogenated or non-halogenated fire retardant.

In addition, while the instant disclosure contemplates the use of a zinc compound as the smoke suppressant, it was determined that zinc salt compounds, and in particular zinc carboxylate, were particularly effective at suppressing smoke in polyisocyanurate boards with the described polyisocyanurate foam compositions. The effectiveness of the zinc salt compound in suppressing smoke may be due to a synergistic effect that the zinc salt compound has in combination with the foam board's high polyol functionality, high isocyanate index, and/or use of a halogenated or non-halogenated fire retardant.

It was determined that four factors are necessary to enable a polyisocyanurate foam having the composition described herein to exhibit a flame spread of no greater than 25 and a smoke index of no greater than 50 in accordance with the ASTM E-84 test. The four factors that are necessary to enable the polyisocyanurate foam to exhibit these properties are the following, which are not presented in any particular or specific order: 1) a polyol functionality of at least 2.2; 2) an isocyanate index of at least 300; 3) a zinc salt smoke suppressant compound; and 4) a halogenated or non-halogenated fire retardant. In regards to the fourth factor, a non-halogenated phosphorous containing fire retardant, and more particularly an isocyanate reactive and/or isocyanate reactive mono-hydroxyl phosphorus containing non-halogenated fire retardant (e.g., DEHMP) was determined to be the most effective fire retardant. The elimination of any one of these variables was determined to cause the polyisocyanurate foam not to exhibit the described flame spread and smoke development and thus, the combination of these factors is critical to achieving the desired result.

In addition to the ability of the polyisocyanurate foam to exhibit the desired flame spread and smoke development, the composition of the polyisocyanurate foam also resulted in an unexpected or surprising increase in R-value and reduction in cell size of the foam. These unexpected properties are described in greater detail below. Thus, in addition to being better suited for fire proofing an enclosure, the polyisocyanurate foam boards described herein also provide increased thermal insulation for the enclosure.

Figure 1:
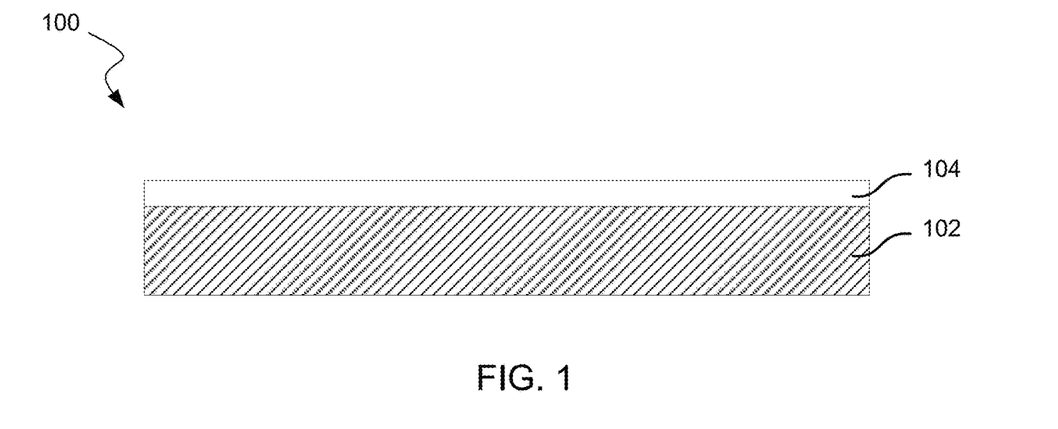
FIG. 1 illustrates an embodiment of a polyisocyanurate foam board.

Referring now to FIG. 1, illustrated is an embodiment of a polyisocyanurate foam board 100 (hereinafter foam board 100). The foam board 100 includes a polyisocyanurate core 102 that is produced from an isocyanate, a polyol, and a blowing agent in accordance with embodiments of the invention. The polyisocyanurate core 102 typically has an average foam cell size of less than about 200 microns, and more commonly between about 100-150. In contrast, conventional foam boards typically have an average foam cell size of between about 200 and 300. The smaller foam cell size of the polyisocyanurate core 102 may enable the core to exhibit an increased R-value when compared with conventional cores. In some embodiments, a polyisocyanurate foam preferably has a cell size of less than 140 microns and more commonly less than 120 microns.

R-values herein are measured according to ASTM standard test method C518. The foam board 100 has or exhibits an R-value of at least 5.8 per inch, and more commonly 6.0 per inch, or 6.5 per inch. In a specific embodiment, the foam board 100 has or exhibits an R-value of 6.6 per inch or more, or has or exhibits an R-value of 7.0 per inch or more. A specific example of an R-value for a polyisocyanurate board having a density of 1.60 to 1.65 lb/ft$^3$ is 5.8 per inch or greater. In a specific embodiment, the foam board exhibit improved 3 inch long-term thermal resistance (LTTR) of no less than 5.9 R/in. The foam board 100 is also typically a closed cell foam (i.e., having greater than 90% OR 95% closed cells) in which the average cell size of the foam is 150 µm or less, and more commonly 140 µm or less, or even 120 µm or less.

In some embodiments, the polyisocyanurate core 102 may include between 1 and 10 weight percent of a hydrocarbon blowing agent, such as any blowing agent described herein. In an example embodiment, the polyisocyanurate core 102 may include between 5 and 8 weight percent of the hydrocarbon blowing agent. The weight percent of the hydrocarbon blowing agent typically corresponds with the foam density of the polyisocyanurate core 102 with lower density foam boards (e.g., insulation boards) having a higher weight percentage of the hydrocarbon blowing agent than more dense foam boards (e.g., roofing cover boards). For example, insulation boards having a density of between about 1.5 and 2.5 pounds per cubic foot (lbs/ft$^3$), commonly have 5% or more of a hydrocarbon blowing agent by weight, and more commonly between about 6 and 7 weight percent. In contrast, roofing cover boards that have a density of up to 10 lbs/ft$^3$, and more commonly between 6 and 7 lbs/ft$^3$, commonly have less than 5% of a hydrocarbon blowing agent by weight, and more commonly between about 1.5 and 3 weight percent.

The foam insulation board may have different densities. For example, a lower density foam insulation board may have a density of between about 1.5 and 2.5 lbs/ft$^3$, including between about 1.6 and 1.8 lbs/ft$^3$. A higher density foam cover board may have a foam density of up to 10 lbs/ft$^3$, including between about 6 and 7 lbs/ft$^3$. For insulation purposes, a foam insulation board in accordance with embodiments of the invention preferably has a density of less than 2.0 lbs/ft$^3$, and more preferably less than 1.7 lbs/ft$^3$, and even more preferably less than 1.61 lbs/ft$^3$.

Foam board 100 also includes an optional facer material 104 that is applied to at least one surface of the polyisocyanurate core 102. The facer material 104 typically includes a glass fiber mat, but may include other types of facer materials. The facer material 104 is typically selected based on the type of polyisocyanurate foam board produced. For example, facers for polyisocyanurate foam insulation boards that are used in roofing applications may include: a reinforced cellulosic felt facer, an un-coated polymer bonded glass fiber mat, a coated polymer bonded glass fiber mat, and the like. In such embodiments, the facer 104 may include a mineral and/or pigment based coating with high solid content to provide one or more desired characteristics, such as low porosity, fire retardancy, mechanical strength, and the like. The facer 104 may have a thickness of between about 0.3 and 1.2 mm.

Facers for polyisocyanurate foam cover boards that are used in roofing applications may include: coated polymer bonded glass fiber mat, which provides desired characteristics, such as low porosity, fire retardancy, mechanical strength, and the like. In such embodiments, the facer 104 may have a thickness of between about 0.4 and 1.2 mm. Facers for polyisocyanurate foam boards that are used in wall applications may include a metal foil facer that is configured to reflect heat, such as from and/or into a structure, and/or may include an un-coated polymer bonded glass mat, coated polymer bonded glass mat, and the like. In such embodiments, the facer 104 may have a thickness of between about 0.006 and 1.2 mm. The thickness of 0.006 mm typically represents the thickness of a metal facer while the 1.2 mm represents the thickness of other facers.

Although FIG. 1 shows the facer 104 being positioned on a single side of the polyisocyanurate core 102, it should be realized that in many embodiments an additional facer may be positioned on the opposite side of the polyisocyanurate core 102. The additional facer may be a similar or different facer than facer 104 and/or may have a different thickness and/or material coating as desired.

The polyisocyanurate foam board 100 commonly has a density of between about 1.45 and 10 lbs/ft³, and more commonly between 1.5 and 7.5 lbs/ft³. In an exemplary embodiment, a polyisocyanurate foam cover board may have a density of between about 4 and 12 lbs/ft³, and more commonly between about 6 and 7 lbs/ft³; a polyisocyanurate foam insulation roofing board may have a density of between about 1.5 and 2.0 lbs/ft³, and more commonly between about 1.6 and 1.7 lbs/ft³; and a polyisocyanurate foam sheathing board may have a density of between about 1.5 and 2.5 lbs/ft³, and more commonly between about 1.6 and 2.0 lbs/ft³.

Figure 2:
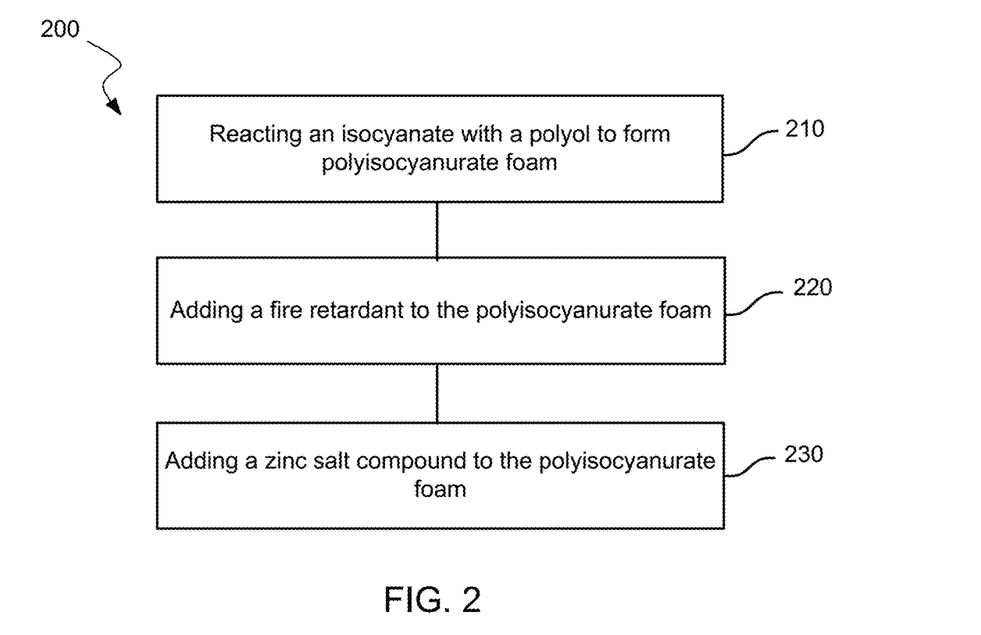
FIG. 2 illustrates a method of forming a polyisocyanurate foam board.

Referring now to FIG. 2, illustrated is a method 200 of producing or forming a foam insulation board. At block 210, an isocyanate is reacted with a polyol to form polyisocyanurate foam. The polyol has a functionality of at least 2.2 and the isocyanate and the polyol are reacted so that the polyisocyanurate foam has an isocyanate index equivalent with or greater than 300. At block 220, a fire retardant is added to the polyisocyanurate foam. At block 230, between 0.02 and 0.45 weight percent of a Zinc salt compound is added to the polyisocyanurate foam. The resulting foam insulation board is capable of exhibiting a flame spread of no greater than 25 and a smoke index of no greater than 50 when exposed to flame conditions in accordance with an ASTM E-84 test. The resulting polyisocyanurate foam may also have an R-value as described herein. In some embodiments, the method includes adding a blowing agent to the polyisocyanruate foam. The blowing agent may include or consists of a hydrocarbon gas, a fluorocarbon gas, water, and the like.

In some embodiments, between 0.045 and 0.23 weight percent of a zinc carboxylate is added to the polyisocyanurate foam, and more commonly between 0.045 and 0.18 or 0.045 and 0.14 weight percent of the zinc carboxylate. In some embodiments, the fire retardant that is added to the polyisocyanurate foam is diethyl hydroxymethyl phosphonate (DEHMP) and/or tris(2-chloroisopropyl)phosphate (TCPP). In some embodiments, the method may also include adding between 1 and 10 weight percent of a hydrocarbon blowing agent to the polyisocyanurate core. The method may also include coupling a facer material with at least one surface of the polyisocyanurate foam. The facer material may include a glass fiber mat, or other mat, that may be selected based on the end application of the foam insulation board as described herein. In some embodiments, an additional facer material may be coupled with an opposite surface of the polyisocyanurate core.

Example Foam Formulations

An example formulation prepared in accordance with embodiments of the invention in a small batch is as shown in Tables 1 and 2 below, and is designated Example 1. The polyisocyanurate foam of Example 1 had a density of 1.65 lb/ft³, an isocyanate index of 325, a cell size of 110 microns, and a polyol functionality of 2.21.

TABLE 1

Example 1 B-Side
B-Side Formulation

| Ingredient | Wt (lb) | Parts | Batch Wt % |
|---|---|---|---|
| Invista HT5503 | 39.7 | 50 | 32.4 |
| Invista HT5349 | 39.7 | 50 | 32.4 |
| DEHMP | 13.5 | 17 | 11.0 |
| Vorasurf 504 | 2.4 | 3 | 1.9 |
| TMR 20 | 1.4 | 1.8 | 1.2 |
| KKAT ®XK-614 (Zinc) | 0.5 | .6 | 0.4 |
| OMG 977 (k-oct) | 4.6 | 5.8 | 3.8 |
| OMG 1123 (K-Ace) | 0.5 | 0.6 | 0.4 |
| Water | 0.3 | 0.40 | 0.3 |
| Pentane 50/50 i/n | 19.9 | 25.1 | 16.3 |
| Total "B" | 122.5 | 154.3 | 100.0 |

TABLE 2

Example 1 A-Side
A-Side Formulation

| Ingredient | Wt (lb) | Parts | Batch Wt % |
|---|---|---|---|
| Yantai Wannate PM-700 | 227.5 | 286.56 | 100.0 |
| Total "A" | 227.5 | 286.56 | 100.0 |

Table 3 below gives the formulations for the B-side mixture of Example 1 and other example embodiments, all of which had a thickness of 1 inch. The polyisocyanurate foam boards also have greater than 93% closed cells.

TABLE 3

| Example Number | Polyol Used | Fire Retardant Used | Metallo-Organic Component | Cell Size (microns) | Index | R-Value/ Inch | Density (pcf) | PIR/PUR |
|---|---|---|---|---|---|---|---|---|
| 1 | HT 5503 HT 5349 | DEHMP | KKAT ®XK-614 (Zinc) | 110 | 325 | 6.98 | 1.65 | 2.21 |
| 2 | HT 5503 | DEHMP | KKAT ®XK-614 (Zinc) | 157 | 350 | 6.82 | 1.65 | 2.66 |
| 3 | HT 5503 HT 5349 | DEHMP | KKAT ®XK-614 (Zinc) | 113 | 325 | 7.02 | 1.61 | 2.55 |
| 4 | HT 5503 | DEHMP | KKAT ®XK-614 (Zinc) | 158 | 325 | 6.71 | 1.61 | 2.37 |
| 5 | HT 5503 | TCPP | KKAT ®XK-614 (Zinc) | 182 | 325 | 6.58 | 1.63 | 2.43 |

In general, polyisocyanurate foam formulations in accordance with embodiments herein may include any one or more components in the amounts shown in Table 4 below.

TABLE 4

| Component | B-Side wt % | Preferred B-Side wt % | More preferred B-Side wt % |
|---|---|---|---|
| Polyol(s) | 50-90 | 60-80 | 65-70 |
| Fire retardant(s) | 5-15 | 8-13 | 10-12 |
| Surfactant(s) | 0.5-4 | 1-3 | 1.5-2.5 |
| Catalyst(s) | 2-10 | 4-8 | 5-6 |
| Zinc salt compound(s) | 0.1-10 | 0.2-5 | 0.3-1.0 |
| Blowing Agent | 5-25 | 10-20 | 15-17 |

Example Wall Systems or Insulated Structures

Wall structures or systems of commercial and residential structures are commonly insulated by filling a wall cavity that is positioned between wall studs (wood or metal). The wall cavity may be filled using a spray foam insulation, batt or roll insulation (e.g., fiberglass, mineral wool, cotton, and the like), loose fill insulation (e.g., fiberglass, cellulose, mineral wool, and the like), or a combination thereof. Thermal bridging from the wall studs can reduce the effectiveness of the cavity insulation. To reduce the effects of thermal bridging, the wall system or structure may include external sheathing insulation (e.g., continuous external sheathing), such as with a foil faced rigid polyisocyanurate foam board, that is coupled with the cavity insulation.

Figure 3:
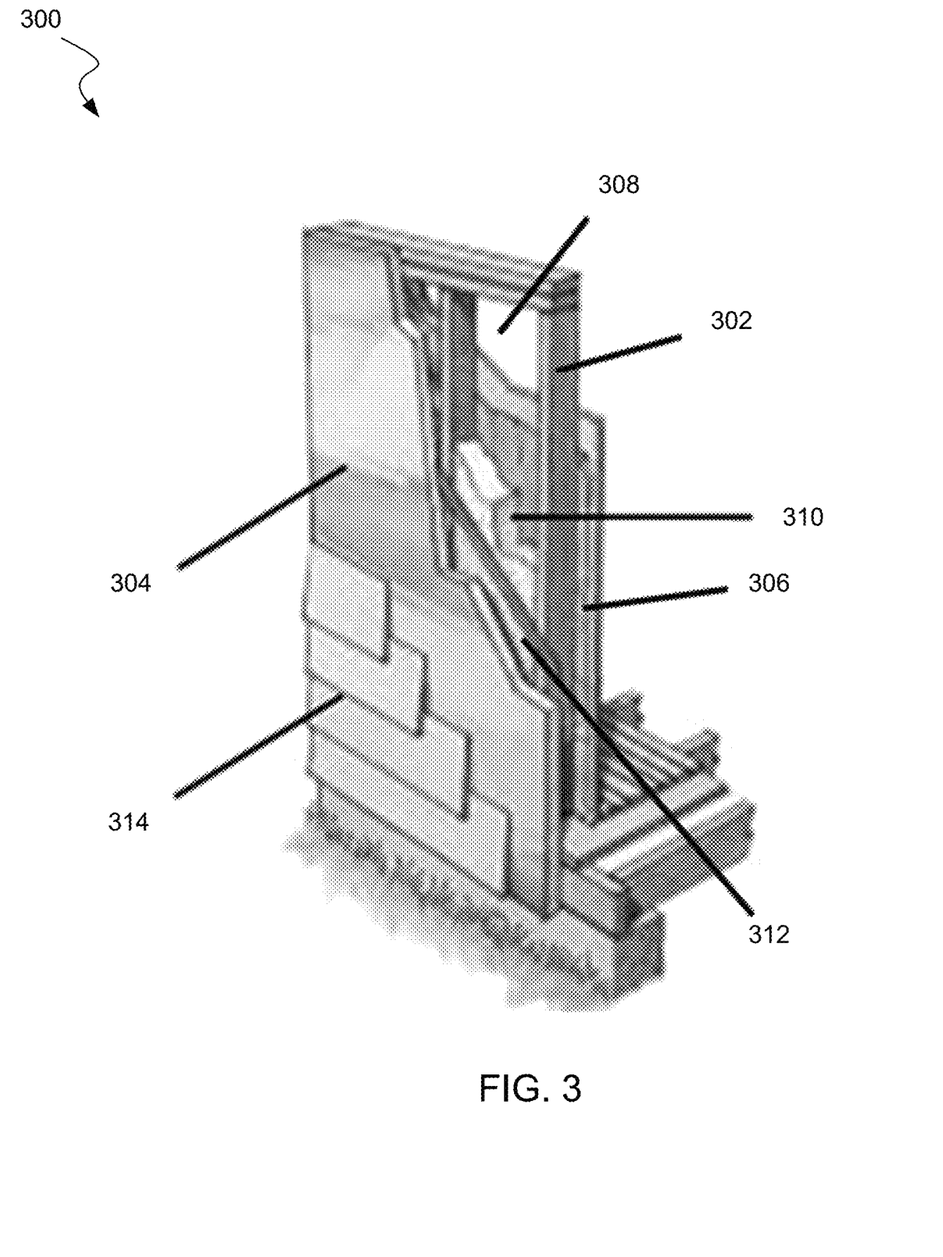
FIG. 3 illustrates a wall system or structure.

Referring now to FIG. 3, illustrated is an embodiment of a wall system or structure 300 that may be used to insulate a commercial or residential structure. Wall system 300 includes a plurality of structural support members or wall studs 302 that are coupled together to form a wall frame. A plurality of foam boards 304 (hereinafter sheathing boards 304) are attached to an exterior side of the frame to form an insulative exterior wall or surface of the wall system 300 (i.e., continuous external sheathing insulation). A plurality of wall boards 306 are attached to an interior side of the frame opposite the sheathing boards 304 to form an interior wall or surface of the wall system 300. Example wall boards 306 include gypsum boards and the like. The wall studs 302, sheathing boards 304, and wall boards 306 define a plurality of wall cavities 308.

Fasteners (not shown) are used to attach the sheathing boards 304 and wall boards 306 to the respective sides of the frame. Each fastener may include an elongate shaft that penetrates through a respective board and into a wall stud 302 to couple the components together. Example fasteners include nails and screws, although in some embodiments non-mechanical fasteners may be used, such as adhesives and the like. An insulation material 310 is positioned within at least one of the wall cavities 308 of the wall system, and more commonly within each wall cavity 308 or within most of the wall cavities. The insulation material 310 is positioned within the wall cavity 308 to insulate the building or structure. As described herein, example insulation materials include spray foam insulation (open cell and/or close cell), batt or roll insulation (e.g., fiberglass, mineral wool, cotton, and the like), loose fill insulation (e.g., fiberglass, cellulose, mineral wool, and the like), or a combination thereof.

In some embodiments, an additional wall board 312 may be attached to the exterior side of the frame. The additional wall board 312 may be a gypsum board, cement board, oriented strand board (OSB), plywood, and the like. The wall board 312 may be positioned between the sheathing board 304 and frame or wall studs 302 for structural support and/or other purposes. External veneer or cladding 314 (hereinafter exterior cladding 314) may be positioned on an exterior side of the sheathing boards 304. The exterior cladding 314 may include brick, stucco, rock, siding, paneling, and the like that provides the structure with an aesthetic appeal while optionally also providing one or more desired mechanical or other characteristics. In some embodiments, a drainage cavity or barrier may be positioned between one or more of the components of the wall system, such as between the exterior cladding 314 and the sheathing boards 304. The wall system 300 may also include other components, layers, and/or materials that are not shown, such as an interior vapor barrier, flashing, primer, and the like.

As described herein, the sheathing board 304 of wall system 300 include a polyisocyanurate foam or core that is produced from reacting an isocyanate and a polyol. The polyisocyanurate foam board exhibits a flame spread of no greater than 25 and a smoke index of no greater than 50 when exposed to flame conditions in accordance with an ASTM E-84 test.

In some embodiments, the sheathing board 304 may also include a foil facer that is attached to an exterior side of the board. The sheathing boards 304 may have a foam density of between about 1.5 and 2.5 lbs/ft$^3$, and more commonly between about 1.6 and 2.0 lbs/ft$^3$. In some embodiments, the polyisocyanurate core also include between 1 and 10 weight percent of a hydrocarbon blowing agent. The sheathing board more commonly include between about 5 and 8 weight percent of the hydrocarbon blowing agent. The sheathing board may be any foam board described herein.

Figure 4:
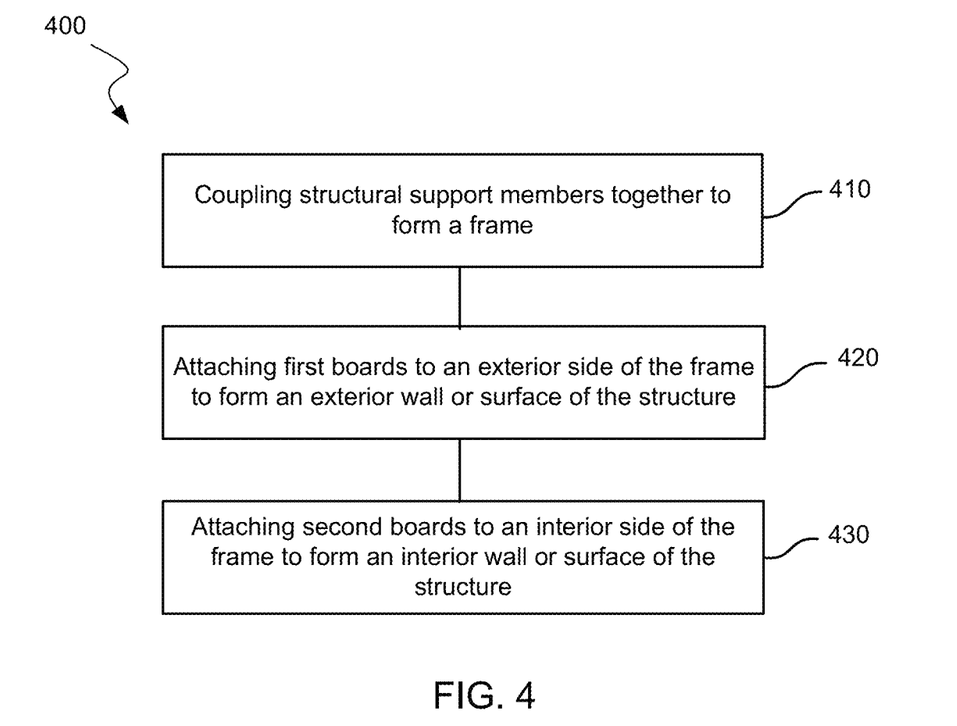
FIG. 4 illustrates a method of forming a wall of a structure.

Referring now to FIG. 4, illustrated is a method 400 of forming a wall of a structure. At block 410, a plurality of structural support members(i.e., wall studs) are coupled together to form a frame. At block 420, a plurality of first boards (i.e., foam boards or polyisocyanurate sheathing boards) are attached to an exterior side of the frame to form an insulative exterior wall or surface. At block 430, a plurality of second boards (i.e., wall boards) are attached to an interior side of the frame to form an interior wall or surface. The structural support members, foam boards, and wall boards are coupled together to define a plurality of wall cavities. An insulation material (e.g., a spray foam material, a fiberglass material, or a combination thereof) may be positioned within at least one of the wall cavities, and commonly most or all wall cavities, to insulate an interior space of the structure.

As described herein, at least one of the foam boards includes a polyisocyanurate core/foam that is produced from reacting an isocyanate and a polyol.

In some embodiments, the method also includes applying between 1 and 10 weight percent of a hydrocarbon blowing agent to the polyisocyanurate core. In some embodiments, the method further includes attaching a foil facer to an exterior side of the polyisocyanurate core. The polyisocyanurate core/foam exhibits a flame spread of no greater than 25 and a smoke index of no greater than 50 when exposed to flame conditions in accordance with an ASTM E-84 test.

Wall systems may include those described in U.S. application Ser. No. 14/299,571, now U.S. Pat. No. 9,523,195, which is incorporated herein by reference for all purposes.

Example Roofing Systems

Commercial and industrial roofing system usually include a combination of layers, such as an insulation layer and a waterproof layer. In some instances, a cover board can be used between the insulation layer and waterproof layer to add fire and/or mechanical protection, such as hail resistance. According to the embodiments herein, a roofing system's insulation layer for commercial and/or industrial roofing includes polyisocyanurate foam boards. The waterproof layer includes a built-up roof, modified bitumen, and/or a single ply membrane, such as thermoplastic olefin (TPO), polyvinyl chloride (PVC), ethylene propylene diene monomer (EPDM), metal, and the like.

Figure 5:
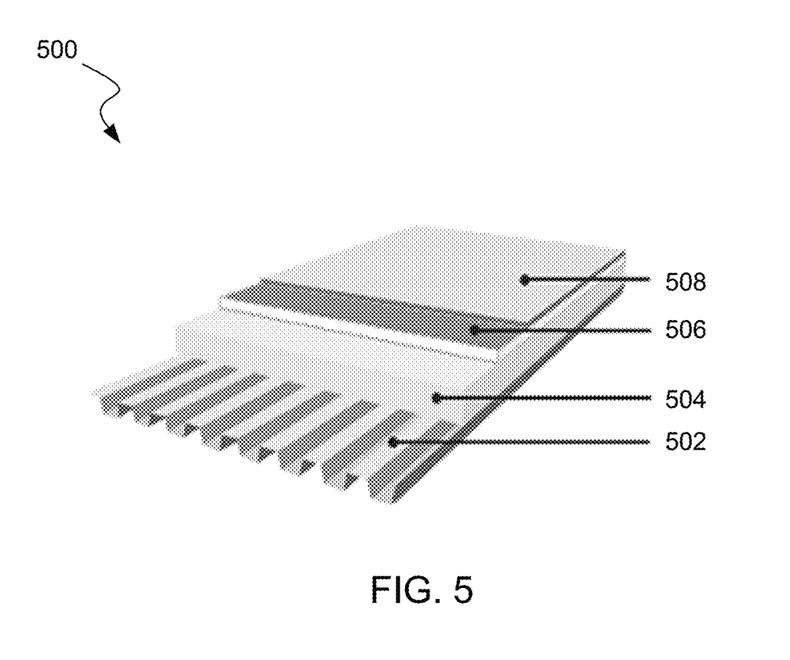
FIG. 5 illustrates a commercial roof deck.

Referring now to FIG. 5, a construction of a commercial roof deck (i.e., roof system 700) is shown. Roof system 500 includes a structural deck 502, which is commonly made of steel or galvanized metal (18 to 22 gauge), although other types of materials and/or sizes are possible. The structural deck 502 is commonly positioned above steel, metal, or other joists and supported thereby. A plurality of foam insulation boards 504 (hereinafter insulation boards 504) are positioned atop the structural deck 502 to form an insulative layer of roofing system 500. As described herein, the insulation boards 504 are preferably polyisocyanurate foam boards that exhibit a flame spread of no greater than 25 and a smoke index of no greater than 50 when exposed to flame conditions in accordance with an ASTM E-84 test.

In some embodiments, a plurality of cover boards 506 are positioned atop the insulation boards 504 to add a protective layer to roofing system 500. The covers board 506 may be added for fire and/or mechanical protection (e.g., hail or impact resistance) or for various other reasons. In embodiments, the cover boards 506 may include perlite based boards, gypsum based boards, and the like. In some embodiments, the roofing system 500 does not include cover boards 506.

A water proof membrane 508 is positioned atop the roofing system 500. The water proof membrane 508 may be positioned atop the cover boards 506, insulation boards 504, and/or another component/layer of the roofing system 500. In some embodiments, the water proof membrane 508 may include a built-up roof, modified bitumen, thermoplastic olefin (TPO), ethylene propylene diene monomer (EPDM), metal, and the like. The water proof membrane 508 may be ballasted, adhered, mechanically fastened, and the like atop the roofing system 500 to couple the water proof membrane 508 with the roofing system's components/layers. Further, individual components of the water proof membrane 508 may be coupled together to form the water proof membrane 508. For example, individual TPO segments, sheets, or strips may be heat welded together to form a substantially continuous TPO layer atop the roofing system 500. Similarly, individual EPDM segments may be adhered or bonded together and metal segments may be mechanically fastened or bonded to form a substantially continuous water proof membrane layer.

The roofing system 500 may be slightly sloped to promote drainage of water and/or for various other reasons as desired. The roof system 500 may also include other components, layers, and/or materials that are not shown, such as bonding cement, primer, acoustic infills, and the like.

As described herein, the insulation boards 504 and/or cover boards 506 are polyisocyanurate foam boards that include a polyisocyanurate core. The polyisocyanurate core is produced from reacting an isocyanate and a polyol. The polyisocyanurate core may be any core described herein.

In some embodiments, each of the insulation boards 504 also includes a facer that is coupled with one or more surfaces of the insulation board 504, commonly both surfaces. The facer typically includes a glass fiber mat, but may include other types of facer materials. The facer may include: a reinforced cellulosic felt facer, an un-coated polymer bonded glass fiber mat, a coated polymer bonded glass fiber mat, and the like. The facer may be coated or uncoated as desired to provide a desired characteristic, such as fire retardancy, mechanical strength, and the like. The insulation board 504 may have a foam density of between about 1.5 and 2.0 lbs/ft$^3$, and more commonly between about 1.6 and 1.7 lbs/ft$^3$. In some embodiments, the insulation board's polyisocyanurate core also includes between 1 and 10 weight percent of a hydrocarbon blowing agent. The insulation boards 504 commonly include between about 5 and 8 weight percent of the hydrocarbon blowing agent.

In some embodiments, each of the cover boards 506 also includes a facer that is coupled with one or more surfaces of the cover board 506, commonly both surfaces. The facer typically includes a glass fiber mat, but may include other types of facer materials. The cover board 506 may have a foam density of between about 3 and 12 lbs/ft$^3$, and more commonly between about 6 and 7 lbs/ft$^3$. In some embodiments, the cover board's polyisocyanurate core also includes between 1 and 10 weight percent of a hydrocarbon blowing agent, which may be a highly flammable material as described herein above. The cover boards 506 commonly include between about 1.5 and 3 weight percent of the hydrocarbon blowing agent.

Figure 6:
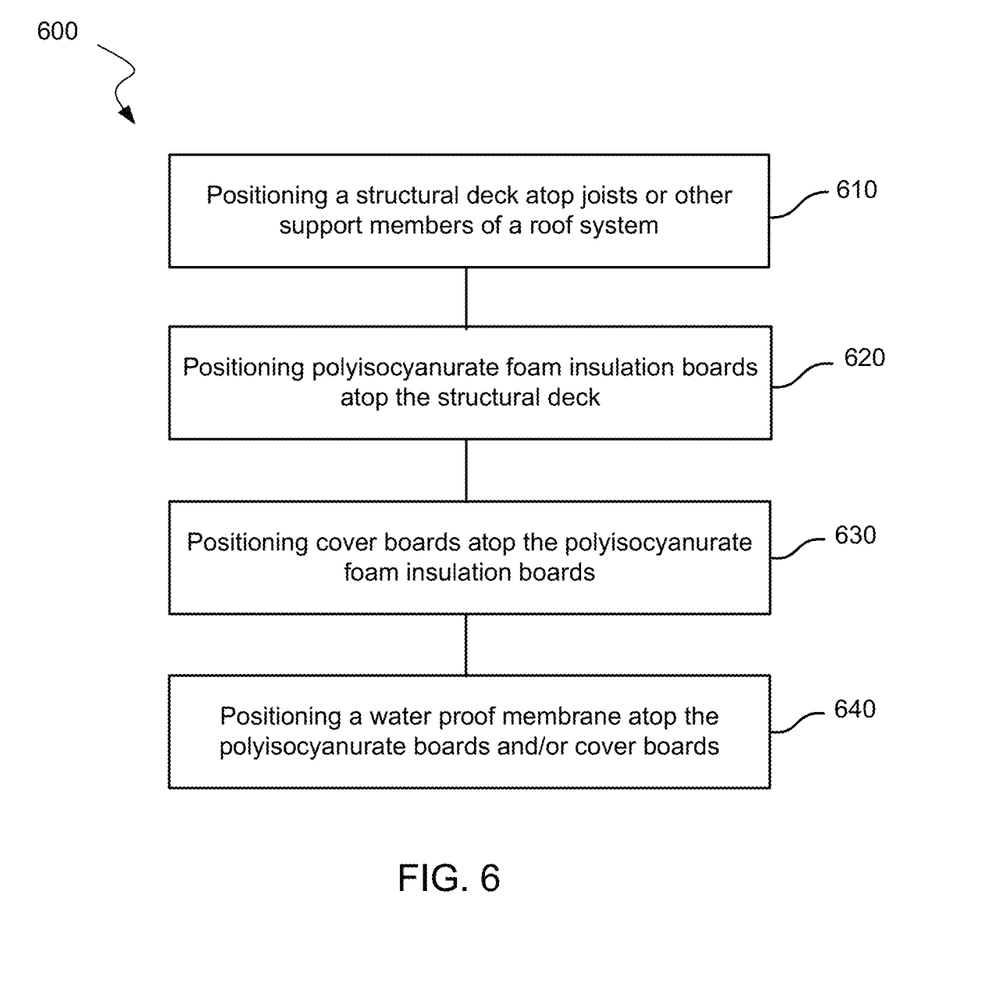
FIG. 6 illustrates a method of forming a roofing system.

Referring now to FIG. 6, illustrated is a method 600 of forming a roofing system of a structure. At block 610, a structural deck is assembled atop joists (metal and the like) or other structurally supporting members. At block 620, a plurality of foam insulation boards (i.e., polyisocyanurate foam roof insulation boards) are positioned atop the structural deck to provide an insulation layer for the roofing system. At block 630, a plurality of cover boards are optionally positioned atop the foam insulation boards to form a protective layer for the roofing system. At block 640, a water proof membrane is positioned atop the foam insulation boards and/or cover boards to provide a water proof layer for the roofing system.

As described herein, at least one of the foam insulation boards includes a polyisocyanurate core that is produced from reacting an isocyanate and a polyol. The polyisocyanurate core may be any polyisocyanurate core described herein, and preferably exhibits a flame spread of no greater than 25 and a smoke index of no greater than 50 when exposed to flame conditions in accordance with an ASTM E-84 test.

In some embodiments, at least one of the cover boards includes a polyisocyanurate core that is produced from an isocyanate, a polyol, and a blowing agent. In some embodiments, the method includes applying between 1 and 10 weight percent of the blowing agent to the polyisocyanurate core of the foam insulation board(s) and/or cover board(s). In some embodiments, the method further includes attaching a facer to at least one surface of the foam insulation board(s) and/or cover board(s).

Roofing systems may include those described in U.S. application Ser. No. 14/299,631, now U.S. Pat. No. 9,528, 269, which is incorporated herein by reference for all purposes.

All patents, patent publications, patent applications, journal articles, books, technical references, and the like discussed in the instant disclosure are incorporated herein by reference in their entirety for all purposes.

"ASTM" refers to American Society for Testing and Materials and is used to identify a test method by number. The year of the test method, and/or any other test method described herein, is either identified by suffix following the test number or is the most recent test method prior to the priority date of this document.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of producing a foam insulation board comprising:
    reacting an isocyanate with a polyol blend to form a polyisocyanurate foam, the polyol blend having a functionality of at least 2.2 and the isocyanate and the polyol blend being reacted so that the polyisocyanurate foam has an isocyanate index equal to or greater than 300;
    adding a blowing agent to the polyisocyanurate foam;
    adding a fire retardant to the polyisocyanurate foam; and
    adding between 0.02 and 0.45 weight percent of a zinc salt compound to the polyisocyanurate foam;
    wherein the foam insulation board exhibits a flame spread of no greater than 25 and a smoke index of no greater than 50 when exposed to flame conditions in accordance with an ASTM E-84 test; and
    wherein the polyisocyanurate foam is a closed cell foam having a cell size of 120 μm or less.

2. The method of claim 1, wherein the zinc salt compound comprises a zinc carboxylate.

3. The method of claim 2, wherein adding the zinc salt compound to the polyisocyanurate foam comprises adding between 0.045 and 0.23 weight percent of the zinc carboxylate to the polyisocyanurate foam.

4. The method of claim 2, wherein adding the zinc salt compound to the polyisocyanurate foam comprises adding between 0.045 and 0.14 weight percent of the zinc carboxylate to the polyisocyanurate foam.

5. The method of claim 1, wherein the fire retardant is non-halogenated.

6. The method of claim 5, wherein the fire retardant comprises diethyl hydroxymethyl phosphonate (DEHMP).

7. The method of claim 1, wherein the fire retardant comprises one or more compounds selected from a group of compounds consisting of an organo-phosphate, an organo-phosphite, and an organo-phosphonate.

8. The method of claim 1, wherein the fire retardant comprises tris(2-chloroisopropyl)phosphate (TCPP).

9. The method of claim 1, wherein the foam insulation board has an R-value per inch of at least 6.6 and an long-term thermal resistance (LTTR) of 5.9 R-value per inch for a board having a thickness of 3 inches and a density of 1.6 lb/ft3.

10. The method of claim 1, wherein the polyisocyanurate foam is a rigid foam having a density of less than 2.0 lbs/ft3.

11. The method of claim 1, wherein the polyisocyanurate foam is a rigid foam having a density of less than 1.7 lbs/ft3.

12. The method of claim 1, wherein the isocyanate and the polyol blend are reacted so that the polyisocyanurate foam has an isocyanate index of between 350 and 450.

13. The method of claim 1, wherein the blowing agent comprises a hydrocarbon gas, a fluorocarbon gas, or water.

14. A method of producing a foam insulation board comprising:
    reacting an isocyanate with a polyol blend to form a polyisocyanurate foam, the polyol blend having a functionality of at least 2.2 and the isocyanate and the polyol blend being reacted so that the polyisocyanurate foam has an isocyanate index equal to or greater than 300;
    adding a blowing agent to the polyisocyanurate foam;
    adding a fire retardant to the polyisocyanurate foam; and
    adding between 0.02 and 0.45 weight percent of a zinc salt compound to the polyisocyanurate foam;
    wherein the foam insulation board exhibits a flame spread of no greater than 25 and a smoke index of no greater than 50 when exposed to flame conditions in accordance with an ASTM E-84 test; and
    wherein the foam insulation board has an R-value per inch of at least 6.6 and an long-term thermal resistance (LTTR) of 5.9 R-value per inch.

15. The method of claim 14, wherein adding the zinc salt compound to the polyisocyanurate foam comprises adding between 0.045 and 0.23 weight percent of a zinc carboxylate to the polyisocyanurate foam.

16. The method of claim 14, wherein adding the fire retardant to the polyisocyanurate foam comprises adding diethyl hydroxymethyl phosphonate (DEHMP) and/or tris(2-chloroisopropyl)phosphate (TCPP) to the polyisocyanurate foam.

17. The method of claim 14, wherein the polyisocyanurate foam is a closed cell foam having a cell size of 120 μm or less.

18. The method of claim 14, wherein the isocyanate and the polyol blend are reacted so that the polyisocyanurate foam has an isocyanate index of between 350 and 450.

* * * * *